June 13, 1933.  F. G. FOLBERTH ET AL  1,913,874

MIRROR

Filed May 28, 1928

INVENTORS
Frederick G. Folberth and William M. Folberth
BY
Richey & Watts
ATTORNEYS Patented June 13, 1933

1,913,874

UNITED STATES PATENT OFFICE

FRED G. FOLBERTH AND WILLIAM M. FOLBERTH, OF CLEVELAND, OHIO

MIRROR

Application filed May 28, 1928. Serial No. 281,050.

This invention relates to rear-view mirrors such as are used on automobiles and the like to enable the driver to see the road behind him.

It is an object of this invention to provide an improved rear-view mirror which may readily be prevented from reflecting the light from lamps of other vehicles into the eyes of the operator of the vehicle to which it is applied.

Other objects will hereinafter appear.

The invention will be better understood from the description of three practical embodiments thereof illustrated in the accompanying drawing, in which:—

Figure 1:
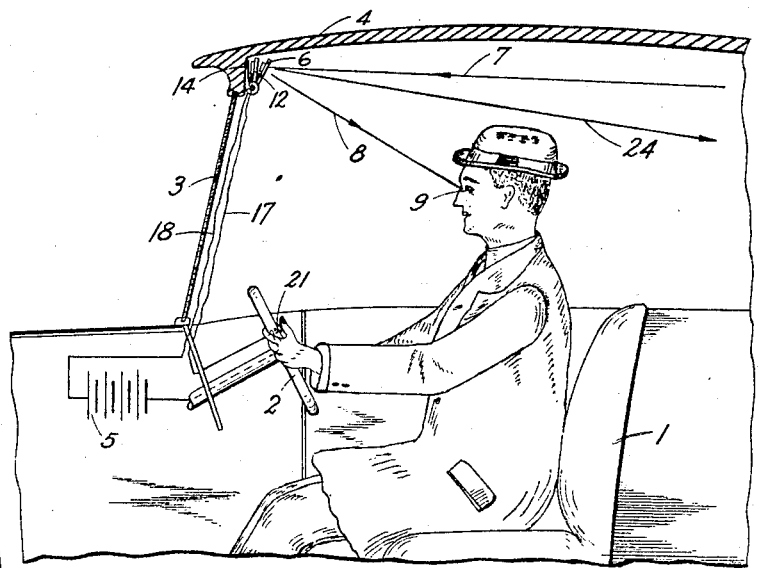
Fig. 1 is a fragmentary longitudinal section of an automobile provided with one embodiment and rear-view mirror constituting this invention.

In Fig. 1 a fragmentary part of an automobile is illustrated, the same consisting of a driver's seat 1, stearing wheel 2, windshield 3, top 4, the battery of the car being indicated at 5. A mirror 6 is situated closely adjacent the top of the vehicle immediately above the windshield so that the operator may see reflected therein objects behind the car. The rays of light 7 coming from a vehicle behind are normally reflected in the direction of the line 8 to the eye 9 of the driver.

Figure 2:
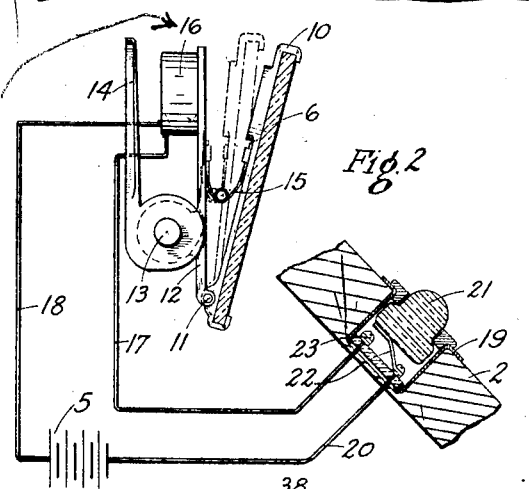
Fig. 2 is an enlarged detail view of parts of the apparatus of Fig. 1.

The mirror is mounted, as more clearly illustrated in Fig. 2. It is retained in a metallic frame 10 of magnetic material, the frame being supported by a pivot 11 upon an adjustable plate 12, in its turn supported by a pivot 13 carried by a bracket 14 permanently fixed to the frame work of the vehicle top. Frame 10 is maintained away from support 12 by means of a spring 15 conveniently arranged as illustrated so that normally these parts are disposed at an acute angle to each other. Support 12 carries an electro-magnet 16 by which the frame 10 may be attracted toward the support. Conductors 17 and 18 pass from the electro-magnet to a switch 19 and to one terminal of the battery of the vehicle, respectively, the other side of the switch being connected to the other terminal of the battery by conductor 20. The switch 19 is mounted upon the steering wheel 2 of the vehicle where it may be conveniently actuated by the driver as by its being pressed with his thumb. The switch may be of any desired type and is shown as comprising an actuating button 21 which presses a spring contact 22 upon a stationary contact 23 to close the circuit.

It will be seen that the mirror can be readily adjusted by moving support 12 about its pivot 13 to any desired position. However, as when driving at night, when a vehicle approaches from the rear with its headlights so bright that this light is reflected into the eye of the operator and interferes with his seeing the road ahead, he has only to press the button and the mirror will be rotated toward a vertical position, reflecting the rays of light backward over his head, as indicated by the dotted line 24.

Figure 3:
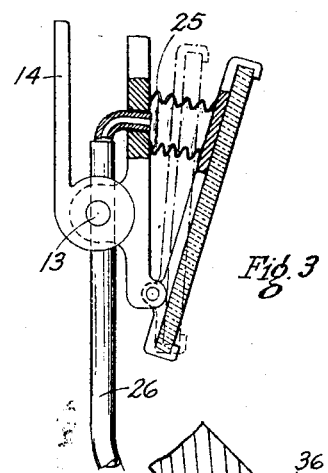
Fig. 3 is a view similar to Fig. 2 of another embodiment of the invention.

In Fig. 3 another embodiment of the invention is illustrated in which a bellows 25 is interposed between the frame and support, the bellows being connected as by a hose or pipe 26 to a valve 27 upon the steering wheel of the vehicle, and the valve being connected by another hose 28 to the intake manifold or other source of difference in fluid pressure which will exhaust the air from the bellows causing the mirror to be rocked toward a vertical position as in the case of the first illustrated embodiment. The valve is simply constructed of a casing 29 having a central bore 30 passing therethrough, the bore being intercepted by ducts 31 and 32 which communicates with the hoses 26 and 28 respectively. A cylindrical valve 33 is slidable in bore 30, being retained upwardly by a coil spring 34, and being depressed by a button 35 upon the wheel, the button being retained in place and the casing clamped to the wheel as by a shouldered ferrule 36 threaded upon the exterior of the casing 29 as illustrated.

Figure 4:
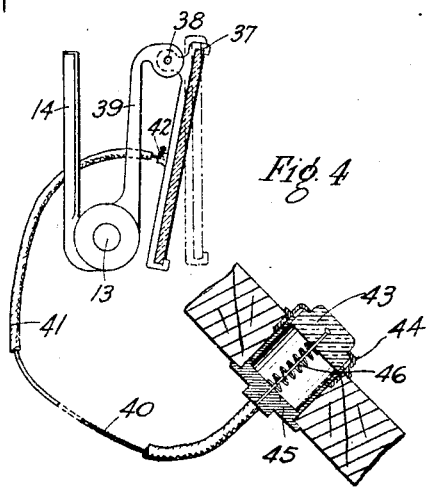
Fig. 4 is a similar view of a third embodiment thereof.

In Fig. 4 the mirror frame 37 is shown as supported by a pivot 38 adjacent its upper end, the pivot being carried by a supporting member 39 which, in turn, is pivoted to bracket 14 as are the supports of the two previously mentioned embodiments. A steel or other compression wire 40 slidable within a flexible casing 41, such as is known as a Bowden wire, has one end secured to the frame at 42, the casing being secured to the support 39 at its adjacent end. The other end of the wire is embedded in an actuating button 43, retained by a cap 44 threaded upon a thimble 45 which is secured to the wheel-end of the flexible casing. A spring 46 maintains the button extended. It will be seen that when the button is depressed the mirror is rotated toward a vertical position by the compression of wire 40 and the rays of light reflected as in the two embodiments previously described.

Obviously in any of the embodiments as soon as the driver releases the actuating button the mirror returns to its normal position and he can again see the road behind him reflected in it.

While I have described the illustrated embodiments of my invention in some particularity obviously many variations and modifications thereof will readily occur to those skilled in the art to which this appertains, and I do not, therefore, limit myself to the precise structure shown and described, but claim as my invention all embodiments coming within the scope of the appended claims.

We claim:

1. A rear-view device for automotive vehicles comprising a supporting bracket, a support angularly adjustable with respect thereto and carried thereby, a mirror pivotally mounted on said support, fluid pressure actuated means for rotating said mirror about one of said pivots and spring means for returning said mirror to its normal position.

2. A rear-view device for vehicles comprising a pivotally supported mirror, fluid pressure actuated means for rotating said mirror about its pivot and spring means for returning said miror to its normal position.

3. A rear-view device for automobile vehicles comprising a pivotally supported mirror, fluid pressure actuated means for rotating said mirror about its pivot, means on the steering wheel of the vehicle for controlling said fluid pressure actuated means and spring means for returning said mirror to its normal position.

4. A rear-view device for automotive vehicles comprising a supporting bracket, a support angularly adjustable with respect thereto and carried thereby, a mirror pivotally mounted on said support, fluid pressure actuated means for rotating said mirror on its pivot, valve means for controlling said fluid pressure actuated means and spring means for returning said mirror to its normal position.

5. A rear-view device for vehicles comprising a supporting bracket, a support angularly adjustable with respect thereto and carried thereby, a mirror pivotally mounted on said support, magnetically actuated means for rotating said mirror on one of said pivots and spring means for returning said mirror to its normal position.

6. A rear-view device for vehicles comprising a pivotally supported mirror, magnetically actuated means for moving said mirror on its pivot and spring means for returning said mirror to its normal position.

7. A rear-view device for vehicles comprising a pivotally supported mirror, magnetically actuated means for moving said mirror on its pivot, means on the steering wheel of the vehicle for controlling said magnetically actuated means and a spring for returning said mirror to its normal position.

8. A rear view mirror, a support to which the mirror is pivoted, power supplying means controllable from the steering wheel of the vehicle for rotating the mirror about its pivot, and spring means for returning the mirror to normal position.

9. A rear view device for automotive vehicles comprising a supporting bracket, a support angularly adjustable with respect to said bracket carried by the latter, a pivot carried by said support, a mirror mounted on said pivot, power supplying means for rotating said mirror about its pivot to move the mirror from its normal adjusted position, a spring for returning said mirror to its normal position, and means under manual control for rendering said power supplying means operative.

10. A rear view device for vehicles comprising a pivotally supported mirror, power supplying means for rotating said mirror about its pivot to move said mirror from its normal adjusted position, means controllable from the floor of the vehicle for rendering said power supplying means operative, and a spring for returning said mirror to its normal position.

11. In combination, a rear vision mirror for use with an automobile, means for normally maintaining the mirror in the proper position to provide the operator of the automobile with rear vision in a practical and convenient manner and fluid pressure means for moving the mirror to another position and for returning the same to its normal position.

12. In combination, a rear vision mirror for use with an automobile, means for rotatably mounting said mirror and for maintaining the same in a normal position for rear vision and fluid pressure means for rotating said mirror out of and returning the same to said normal position, said fluid pressure means being operable through the medium of a vacuum from the engine of the automobile.

13. Apparatus for adjustably mounting the rear vision mirror of an automobile including a pivot member adapted to be secured to the frame of the automobile, a mirror support rotatably mounted thereon and a fluid pressure motor operable to control the rotation of the support to either of two positions.

14. In combination, a rear vision mirror for use with an automobile, means for biasing the mirror to a position wherein it provides the operator of the automobile with a view of the road to the rear, a motor cooperable with the mirror to shift the same out of rear vision position and control means for the motor within convenient reach of the operator.

In testimony whereof we hereunto affix our signatures this 22nd day of May, 1928.

FRED G. FOLBERTH.
WILLIAM M. FOLBERTH.